United States Patent
Picard et al.

(10) Patent No.: US 8,453,582 B2
(45) Date of Patent: Jun. 4, 2013

(54) WORKSTATION WITH POSITION MEMORY

(75) Inventors: Christian Picard, Claudebec les Elbeuf (FR); Olivier Piquenot, Saint Leger de Rôtes (FR)

(73) Assignee: Cassidian SAS, Elancourt (FR)

( * ) Notice: Subject to any disclaimer, the term of this patent is extended or adjusted under 35 U.S.C. 154(b) by 20 days.

(21) Appl. No.: 13/376,774

(22) PCT Filed: Apr. 16, 2010

(86) PCT No.: PCT/EP2010/055073
§ 371 (c)(1),
(2), (4) Date: Jan. 6, 2012

(87) PCT Pub. No.: WO2010/142482
PCT Pub. Date: Dec. 16, 2010

(65) Prior Publication Data
US 2012/0111237 A1    May 10, 2012

(30) Foreign Application Priority Data

Jun. 9, 2009 (FR) .................................. 09 53813

(51) Int. Cl.
*A47B 37/00* (2006.01)
*A47B 88/00* (2006.01)

(52) U.S. Cl.
USPC ................. 108/50.01; 312/334.44; 248/298.1

(58) Field of Classification Search
USPC .......................... 108/50.01, 137–143, 44, 91; 312/334.44–334.47, 331, 330.1, 319.8; 248/298.1, 241
See application file for complete search history.

(56) References Cited

U.S. PATENT DOCUMENTS

| | | | | |
|---|---|---|---|---|
| 2,875,903 A | * | 3/1959 | Shourds | 211/100 |
| 3,017,655 A | * | 1/1962 | Check | 16/82 |
| 3,378,321 A | * | 4/1968 | Sobel et al. | 312/215 |
| 5,265,542 A | * | 11/1993 | Allard et al. | 108/138 |
| 5,378,106 A | * | 1/1995 | Risley et al. | 414/608 |
| 5,395,165 A | * | 3/1995 | Woerner | 312/110 |
| 6,199,490 B1 | * | 3/2001 | Langer | 108/143 |

FOREIGN PATENT DOCUMENTS

| | | |
|---|---|---|
| DE | 39 17 954 A1 | 12/1990 |
| DE | 44 06 061 A1 | 8/1995 |
| EP | 1 153 789 B1 | 7/2007 |
| FR | 2 790 431 A3 | 9/2000 |
| WO | WO 2008/023181 | 2/2008 |

\* cited by examiner

*Primary Examiner* — Janet M Wilkens
*Assistant Examiner* — Timothy M Ayres
(74) *Attorney, Agent, or Firm* — Pillsbury Winthrop Shaw Pittman, LLP

(57) ABSTRACT

A workstation with position memory includes a stationary flat mounting, a plate translatably mounted relative to the stationary flat mounting and a locking system secured to the plate. The workstation also includes a fastener secured to the stationary flat mounting, a strap including a first end, an intermediate portion and a second end, the first end being attached to the fastener and the second end being free from any strain. The locking system has a first open position in which the locking system can slide along the intermediate portion and a second closed position in which the locking system is retained in a locked position along the intermediate portion. The invention has a direct application in the field of military vehicles.

9 Claims, 3 Drawing Sheets

WORKSTATION WITH POSITION MEMORY

CROSS REFERENCE TO RELATED APPLICATIONS

This application is the U.S. National Stage of PCT/EP2010/055073, filed Apr. 16, 2010, which in turn claims priority to French Patent Application No. 0953813, filed Jun. 9, 2009, the entire contents of all applications are incorporated herein by reference in their entireties.

The invention relates to a workstation with position memory. The invention has a most particularly interesting application in the context of integrating this workstation with position memory inside a military vehicle.

In a known manner, certain types of military vehicles, such as AICV (Armored Infantry Combat Vehicles, an example 10 of which is illustrated in FIG. 1) carry a plurality of workstations 1 within a rear compartment 13. The workstations are particularly constituted of a stationary flat support 2, a plate 3 translatably mounted relative to said stationary flat support 2 and a computer 14 offering the ability to users 12 to send and receive messages.

Usually, workstations 1 are positioned transversely with relation to the displacement of vehicle 10 and operators 12 are positioned on the sides 15 of vehicle 10. A single access way 11 is situated between the different workstations 1 and sides 15 of vehicle 10.

It should be noted that workstations 1 have two positions, a storage position and a usage position.

Therefore, a workstation 1 is in the storage position when plate 3 is on the stationary flat support 2 and conversely, workstation 1 is in a usage position when plate 3 is totally or partly in the access way 11.

Because of this, when one of the operators 12 wishes to access his workstation 1 in the storage position, he moves plate 3 towards his chest. Workstation 1 is thus in a position of use effectively obstructing access way 11 and prohibiting another operator 12 from either accessing his workstation 1 or accessing the vehicle 10 exit.

Consequently, once one of the operators 12 wishes to access the vehicle 10 exit or his workstation 1, he may be blocked by operators 12 having their workstations 1 in the position of use, who must then position their workstations 1 in the storage position.

Moreover, for better operator comfort, the workstations 1 are equipped with a system for immobilization in translation (not represented). Such a system enables plate 3 to be immobilized in translation. This action is carried out when the adequate working position is obtained.

Such immobilization systems are formed, for example, by screw or indexing systems. Nevertheless, these systems comprise several disadvantages.

Thus, with each positioning of plate 3 in the position of use, the optimal position corresponding to an ergonomic position of use must be found. This operation thus leads to lost time for the operators 12.

In addition, these indexing systems for immobilization in translation require a positioning step, de facto prohibiting certain positions.

In addition, with each action on plate 3, operators 12 must perform tedious operations such as, for example, the positioning of the indexing system or the screwing and unscrewing of the screw system.

Moreover, vibrations from the vehicle 10 sometimes lead to loosening of the screw immobilization system.

Lastly, the indexing immobilization system presents a residual clearance that is uncomfortable for operators 12.

In general, the aforementioned operations generate a time loss for the operators.

In fact, once an operator wishes to modify the position of his workstation, current mechanical immobilization systems require an intervention on the part of the operator in question. This operation consists of acting on the immobilization system, either to enable the translation of the plate 3 or to prohibit such translation.

In addition to the loss of time generated by carrying out these operations, the position of use must be defined by the operator with each positioning of the workstation in the position of use.

In this context, the invention aims to propose a workstation that is simple, precise and quick to implement and that is free from the aforementioned problems.

For this purpose, the object of the invention applies to a workstation with position memory comprising:
  a stationary flat support;
  a plate translatably mounted relative to said stationary flat support;
  a locking system secured to said plate;
said workstation being characterized in that the workstation also comprises:
  tie means secured to said stationary flat support;
  a strap comprising a first end, an intermediate portion and a second end, said first end being attached to said tie means and said second end being free from any strain, said locking system having:
    a first open position such that said locking system slides along said intermediate portion, and
    a second closed position such that said locking system is retained in a locked position along said intermediate portion.

The invention thus enables the setting for an initial position of use as well as a rapid positioning of the workstation in the storage position or in the usage position without impacting the setting for the initial position.

In addition to the principal characteristics that have just been mentioned in the previous paragraph, the workstation according to the invention may present one or more of the additional characteristics below, considered individually or according to all technically feasible combinations:
  said tie means comprising:
    a first position such that said tie means exert tension on said strap, and
    a second position such that said tie means do not exert tension on said strap;
  said tension exerted by said tie means on said strap is greater than 20 N;
  said tie means are formed by a ratchet strap tensioner;
  said locking system is a clamp type system;
  said plate comprises an inclined upper surface;
  said locking system is situated on the lower surface of said plate and/or said tie means are situated on the lower surface of said stationary flat support;
  said intermediate portion of said strap passes around said stationary flat support and passes through said locking system.

Another object of the present invention is a vehicle comprising a plurality of workstations with position memory in conformance with the invention.

Other characteristics and advantages of the invention will clearly emerge from the description given below, for indicative and in no way limiting purposes, with reference to the attached figures, among which:

FIG. 1 illustrates workstations from the prior art.

Figure 1:
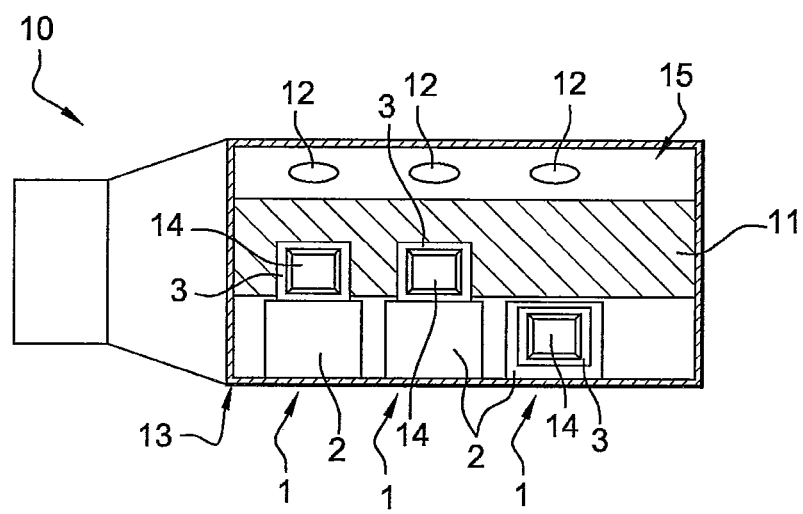
FIG. 1 illustrates an example of a vehicle equipped with workstations according to the prior art.

For reasons of clarity, elements appearing in different figures have been designated with similar references. In addition, only the elements useful for understanding the invention have been represented, without respecting the scale and schematic manner.

FIGS. 2A to 2D represent a same workstation 1 with position memory in conformance with the invention according to different positions of use.

Workstation 1 particularly comprises:
a stationary flat support 2;
a plate 3;
a strap 4 comprising a first end 5, an intermediate portion 6 and a second end 7;
a locking system 9; and
tie means 8.

Tie means 8 are situated on the lower surface of the stationary flat support 2. The first end 5 of strap 4 is maintained by the tie means 8. These tie means 8 may be formed by any type of system enabling the first end 5 of strap 4 to be maintained with and secured to the stationary flat support 2.

According to an advantageous embodiment of the invention, tie means 8 may be formed by a ratchet strap tensioner. In addition to the special feature of maintaining and securing the first end 5 of strap 4 with the stationary flat support 2, said tensioner offers the ability to tighten strap 4 so as to eliminate any residual clearance. This characteristic will be explained later.

The intermediate portion 6 of strap 4 passes around the stationary flat support 2 and traverses the locking system 9. This system is secured to plate 3 and is situated on the lower face of plate 3.

Figure 2A:
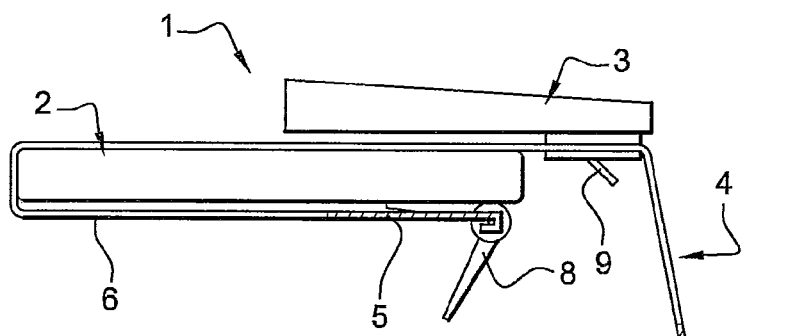
FIG. 2A represents an example of a workstation according to the invention in the storage position.
Figure 2B:
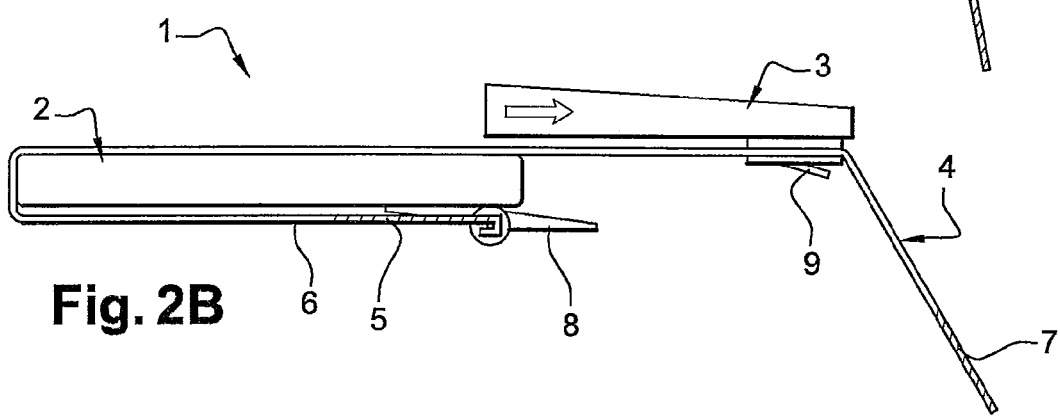
FIG. 2B represents an example of a workstation in conformance with the invention in a setting situation.
Figure 2C:
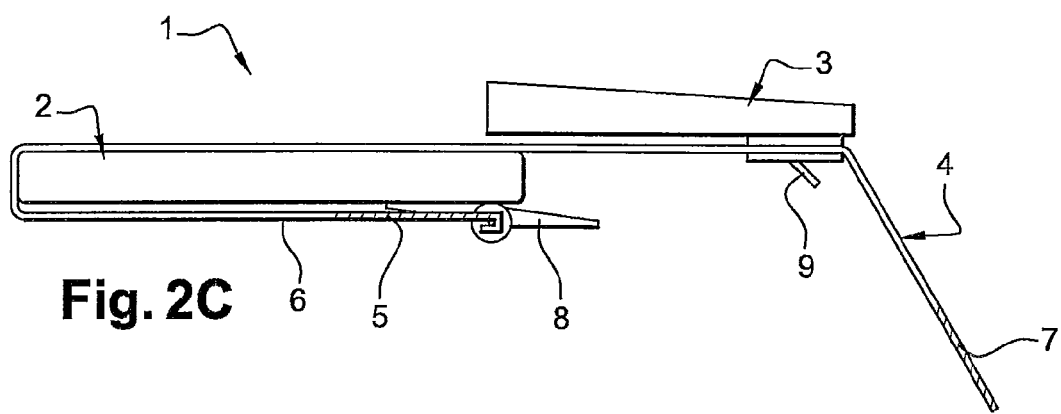
FIG. 2C represents an example of a workstation in conformance with the invention in a set position of use.
Figure 2D:
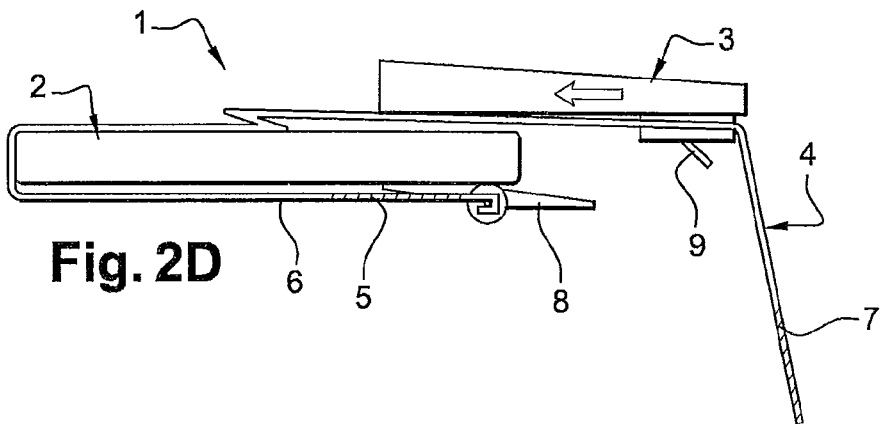
FIG. 2D represents an example of a workstation according to the invention pushed back into the storage position after setting the position as illustrated in FIGS. 2B and 2C.

This locking system 9 comprises two positions, i.e.:
a first open position, illustrated in FIG. 2B, which enables the plate 3 to slide along strap 4; and
a second closed position, illustrated in FIGS. 2A, 2C, and 2D, which prohibits any movement in translation of plate 3 relative to strap 4. Consequently, when the locking system 9 is in this position, the intermediate portion 6 of strap 4 is locked within the locking system 9.

In addition, it should be noted that plate 3 is able to be displaced in translation on the stationary flat support 2 by means of a slide or any other means, not represented, enabling translation of plate 3 relative to the stationary flat support 2.

The layout and interactions of different elements of workstation 1 in conformance with the invention are now described.

FIG. 2A represents an example of a workstation with position memory 1 in conformance with the invention in the storage position.

Strap 4 is tightened by tie means 8. They are formed by a ratchet strap tensioner. Because of this, in the storage position, no translation movement of plate 3 relative to the stationary flat support 2 is possible. Such tightening is preferentially used when the vehicle is displaced.

It should be noted that the tension exerted by the tie means 8 on strap 4 is greater than 20 N and may be close to 100 N. This tension results in a gain of some millimeters to some centimeters on the length of strap 4, eliminating any possible clearance. More generally, this tension is calculated according to the ratio between:
the weight of the assembly particularly constituted of the workstation 1 and the plate 3, and
the incline of this assembly.

In addition, when such tension is exerted on strap 4, the locking system 9 may not be activated.

Consequently, to pass the plate 3 from a storage position to a usage position, it is necessary to unlock the tie means 8.

In conformance with the representation illustrated in FIGS. 2A and 2B, tie means 8 have two positions, i.e.:
a first position, corresponding to the substantially vertical position of the lever, in which tension is exerted on strap 4, and
a second position, corresponding to the substantially horizontal position of the lever, in which no tension is exerted on strap 4.

Nevertheless, it is understood that this characteristic applies to the tie means 8 formed by a ratchet strap tensioner. In the event according to which tie means 8 are formed by a hook, this release step is not critical.

According to an embodiment illustrated in FIGS. 2A and 2B, the operator must exert rotational force on the lever of tie means 8. The lever thus passes from a substantially vertical position to a substantially horizontal position.

When the lever of the tie means 8 is in a substantially horizontal position, no tension is exerted on strap 4. The unlocking system 9 thus may be released.

As illustrated in FIG. 2B, the release of the unlocking system 9 enables plate 3 to slide along strap 4. The operator may thus position plate 3 as desired.

For reference, a computer and/or a computer keyboard are disposed on plate 3. The operator thus positions plate 3 at a comfortable working distance.

Then, as illustrated in FIG. 2C, once an ergonomic position of use of the workstation 1 is selected by the operator, the operator again locks the locking system 9. The intermediate portion 6 of strap 4 is thus locked within the locking system 9.

This locking thus consists of defining a strap length. This length corresponds to the length of strap necessary to place plate 3 in a position of use desired by the operator. Thus, the position of use determined by the operator is not modified even if plate 3 is pushed back into the storage position.

This characteristic is illustrated in FIG. 2D. In fact, plate 3 is pushed back. This action is carried out by merely exerting force on plate 3.

Thanks to the invention, the initial setting is not modified. It is important to emphasize that the only action performed by the operator, to place plate 3 in the storage position, is to merely press on plate 3.

Similarly, in view of positioning plate 3 in the position of use, merely exerting a traction force on plate 3 is sufficient. This force is exerted until plate 3 cannot be displaced further. The travel of plate 3 is thus limited by the maximum travel of strap 4, i.e., the length of strap 4 situated between the first end 5 of strap 4 and the intermediate portion 6 locked within the locking system 9.

Figure 3A:
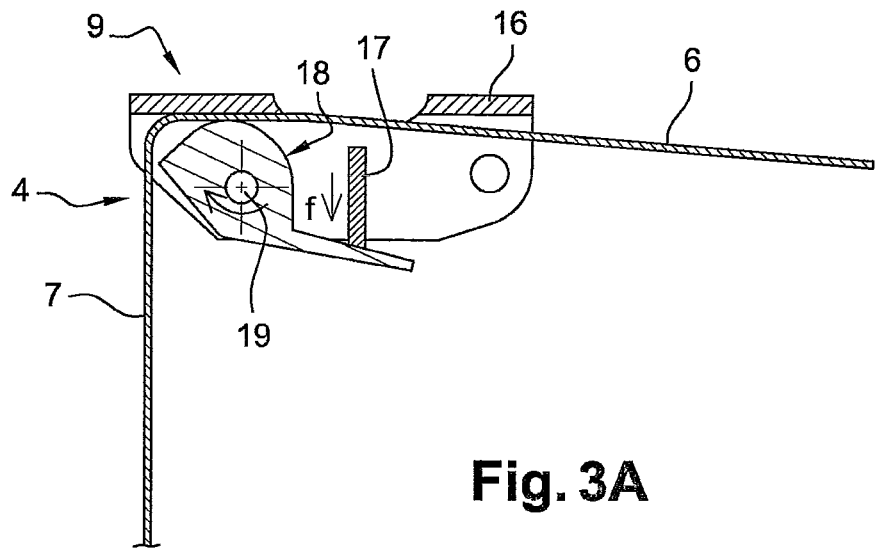
FIG. 3A represents an example of a locking system in a closed position.

Such locking of the intermediate portion 6 of strap 4 within the locking system 9 is illustrated in FIG. 3A that represents an example of the locking system 9. This system is represented in FIG. 3A in the closed position, i.e, in the locking position.

The locking system 9 comprises:
a support 16;
a return spring system 17; and
a trigger 18 in rotation around a pin 19.

According to such an embodiment, support 16 may be for example positioned and fixed on plate 3. The intermediate portion 6 of strap 4 passes between support 16 and trigger 18. The return spring system 17 exerts a pushing force f on trigger 18, leading this trigger in rotation around pin 19. This rotation is carried out in the clockwise direction. Strap 4 is then locked between support 16 and trigger 18.

Figure 3B:
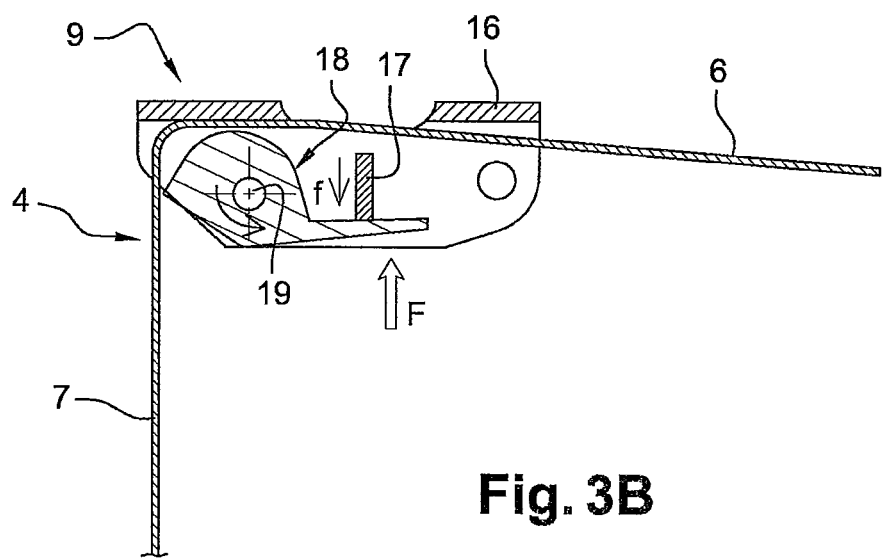
FIG. 3B represents an example of a locking system in an open position.

FIG. 3B illustrates a locking system 9 identical to that represented in FIG. 3A. However, a second force F is manually exerted by an operator on trigger 18. This second force F opposes force f that is exerted by the return spring system 17. Consequently, trigger 18 rotates around pin 19 in the counter clockwise direction. Thus, the intermediate portion 6 of strap 4 is released and plate 3 may then slide along strap 4.

For reference, the length of strap 4 forming the maximum travel of plate 3 is determined during the step illustrated in FIG. 2C consisting of determining an optimum position of use by an operator.

In addition, when the operator wishes to lock plate 3 in the storage position, it is necessary to perform the following actions:
unlock the locking system 9;
slide the plate 3 along strap 4 until plate 3 is in the storage position;
lock the locking system 9;

Then tighten the strap 4 by using tie means 8. It clearly emerges from the aforementioned description that the position of plate 3 may easily and quickly be modified without necessarily, on the one hand, requiring tedious operations to be performed or, on the other hand, requiring the position of use to be set every time after plate 3 is put in the storage position.

In summary, an operator determines the position of use of his workstation 1 once.

In addition, so as to optimize the ergonomics of the workstation, the upper face of plate 3 is inclined.

Furthermore, it should be noted that the second end 7 of strap 4 is free from any strain.

The field of application of the invention is that of military vehicles in general. The device according to the invention may be applied to any type of vehicle transporting workstations and it may also be applied to any space comprising at least one workstation. Because of this, the invention is applicable to the automobile, aeronautics, railroad, maritime or else industrial field.

It is understood that the person skilled in the art is capable of carrying out different variations of the invention without necessarily departing from the scope of the patent, particularly relating to the positioning of the tie system and/or the locking system.

The invention claimed is:

1. A workstation with position memory comprising:
a stationary flat support;
a plate translatably mounted relative to said stationary flat support;
a locking system secured to said plate;
a fastener secured to said stationary flat support;
a strap comprising a first end, an intermediate portion and a second end, said first end being attached to said fastener and said second end being free from any strain, said locking system having:
a first open position such that said locking system slides along said intermediate portion, and
a second closed position such that said locking system is retained in a locked position along said intermediate portion.

2. The workstation according to claim 1, wherein said fastener is configurable between:
a first position such that said fastener exerts tension on said strap, and
a second position such that said fastener does not exert tension on said strap.

3. The workstation according to claim 2, wherein said tension exerted by said fastener on said strap is greater than 20 N.

4. The workstation according to claim 2, wherein said fastener is formed by a ratchet strap tensioner.

5. The workstation according to claim 1, wherein said locking system is a clamp type system.

6. The workstation according to claim 1, wherein said plate comprises an inclined upper surface.

7. The workstation according to claim 1, wherein said locking system is situated on the lower surface of said plate and/or said fastener is situated on the lower surface of said stationary flat support.

8. The workstation according to claim 1, wherein said intermediate portion of said strap passes around said stationary flat support and passes through said locking system.

9. A vehicle comprising a plurality of workstations with position memory according to claim 1.

* * * * *